US008726669B2

(12) United States Patent
Brown et al.

(10) Patent No.: US 8,726,669 B2
(45) Date of Patent: May 20, 2014

(54) COMBUSTOR DOME WITH COMBINED DEFLECTOR/MIXER RETAINER

(75) Inventors: Daniel Dale Brown, Cincinnati, OH (US); Glenn Edward Wiehe, West Chester, OH (US); Michael Terry Bucaro, Cincinnati, OH (US); Stephen William Freund, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 408 days.

(21) Appl. No.: 13/174,027

(22) Filed: Jun. 30, 2011

(65) Prior Publication Data

US 2013/0004906 A1    Jan. 3, 2013

(51) Int. Cl.
*F23R 3/14* (2006.01)
(52) U.S. Cl.
USPC ............................................. 60/748; 60/740
(58) Field of Classification Search
CPC ............... F23R 3/14; F23R 3/50; F23R 3/60; F23R 3/286
USPC ................... 60/740, 748, 752–760, 796–800
See application file for complete search history.

(56) References Cited

U.S. PATENT DOCUMENTS

| | | | |
|---|---|---|---|
| 5,117,637 A * | 6/1992 | Howell et al. | 60/748 |
| 5,222,358 A * | 6/1993 | Chaput et al. | 60/796 |
| 5,237,820 A | 8/1993 | Kastl et al. | |
| 5,321,951 A | 6/1994 | Falls et al. | |
| 5,353,599 A * | 10/1994 | Johnson et al. | 60/748 |
| 6,212,870 B1 | 4/2001 | Thompson et al. | |
| 6,434,946 B1 | 8/2002 | Shaw et al. | |
| 6,453,671 B1 | 9/2002 | Leen et al. | |
| 6,502,400 B1 | 1/2003 | Freidauer et al. | |
| 7,062,920 B2 | 6/2006 | McMasters et al. | |
| 7,121,095 B2 | 10/2006 | McMasters et al. | |
| 7,131,273 B2 | 11/2006 | Howell et al. | |
| 7,185,497 B2 * | 3/2007 | Dudebout et al. | 60/776 |
| 7,654,091 B2 | 2/2010 | Al-Roub et al. | |
| 2007/0119052 A1 | 5/2007 | Caldwell et al. | |

FOREIGN PATENT DOCUMENTS

| | | |
|---|---|---|
| EP | 1253379 | 11/2003 |
| EP | 1290378 | 8/2005 |
| WO | 0190652 | 11/2001 |

* cited by examiner

*Primary Examiner* — Phutthiwat Wongwian
(74) *Attorney, Agent, or Firm* — William Scott Andes; Trego, Hines & Ladenheim, PLLC

(57) ABSTRACT

A combustor dome assembly includes a dome plate with upstream and downstream faces and an aperture therein; a deflector with body and a tube section, the deflector fixedly attached to the dome plate adjacent the downstream face with the tube section in the aperture; a retainer having an annular body with a central opening therein, an annular flange, and at least one hook defining a slot, the retainer being fixedly attached to the dome plate adjacent the upstream face of the dome plate with the flange received in the aperture; and an annular mixer with a radial array of swirl vanes and an annular mounting flange, with a retention tab extending radially outward from the mounting flange. The mixer is disposed adjacent the upstream face with the mounting flange against the retainer. The retention tab is engaged in the slot to prevent axial withdrawal of the mixer from the retainer.

18 Claims, 5 Drawing Sheets

… (US 8,726,669 B2)

COMBUSTOR DOME WITH COMBINED DEFLECTOR/MIXER RETAINER

BACKGROUND OF THE INVENTION

This invention relates generally to gas turbine engines, and more particularly to combustors of such engines.

A gas turbine engine includes a compressor that provides pressurized air to a combustor wherein the air is mixed with fuel and burned for generating hot combustion gases. These gases flow downstream to one or more turbines that extract energy therefrom to power the compressor and provide useful work such as powering an aircraft in flight. Annular combustors used in aircraft engines typically include inner and outer combustion liners joined at their upstream ends to a dome assembly or simply a "dome." The dome assembly includes an annular dome plate and a plurality of circumferentially spaced mixer assemblies mounted therein for introducing the fuel/air mixture to the combustion chamber. Each mixer assembly has a deflector extending downstream therefrom for preventing excessive dispersion of the fuel/air mixture and shielding the dome plate from the hot combustion gases of the combustion chamber. A fuel injector stem extends into in each mixer assembly.

In one known dome configuration, the deflectors are rigidly mounted to the dome plate (for example by brazing), while the mixers are loosely mounted to the dome plate so that some relative motion is possible. Until the fuel injector stems are installed, the mixers can become dislodged from their intended positions. Prior art designs address this problem by using separate bolted-on components such as retention tabs to retain the swirlers. This drives up the complexity and time required to assemble the combustor, and can increase thermal stresses in the combustor during operation because of the presence of the bolted joints.

Accordingly, there is a need for a combustor dome assembly that is simple to assemble, which reliably retains the mixers and deflectors.

BRIEF DESCRIPTION OF THE INVENTION

This need is addressed by the present invention, which provides a combustor dome assembly having a retainer which is fixedly attached to a deflector and mechanically coupled to a corresponding mixer.

According to one aspect of the invention, a combustor dome assembly includes: an annular dome plate with opposed upstream and downstream faces and having an aperture formed therein; a deflector having a body and a tube section extending axially therefrom, the deflector disposed adjacent the downstream face, and fixedly attached to the dome plate with the tube section received in the aperture; a retainer having an annular body with a central opening therein, an annular flange extending axially from a perimeter of the central opening, and at least one hook extending away from the body so as to define a slot, the retainer being disposed adjacent the upstream face of the dome plate, and fixedly attached to the dome plate with the flange received in the aperture; and an annular mixer including a radial array of swirl vanes and an annular mounting flange, with a retention tab extending radially outward from the mounting flange, the mixer disposed adjacent the upstream face with the mounting flange against the retainer, and a portion thereof received in the aperture, wherein the retention tab is engaged in the slot so as to prevent axial withdrawal of the mixer from the retainer.

According to another aspect of the invention, a method of assembling a combustor dome includes: providing an annular dome plate with opposed upstream and downstream faces and having an aperture formed therein; providing a deflector which has a body and a tube section extending axially therefrom; fixedly attaching the deflector to the dome plate adjacent the downstream face, with the tube section received in the aperture; providing a retainer having an annular body with a central opening therein, an annular flange extending axially from a perimeter of the central opening, and at least one hook extending away from the body so as to define a slot; fixedly attaching the retainer to the dome plate adjacent the upstream face, with the flange received in the aperture; providing an annular mixer including a radial array of swirl vanes and an annular mounting flange, with a retention tab extending radially outward from the mounting flange; mounting the mixer adjacent the upstream face of the dome plate with the mounting flange against the retainer, with the retention tab free of the hook; and rotating the mixer such that the retention tab engages the slot of the hook so as to prevent axial withdrawal of the mixer from the retainer.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
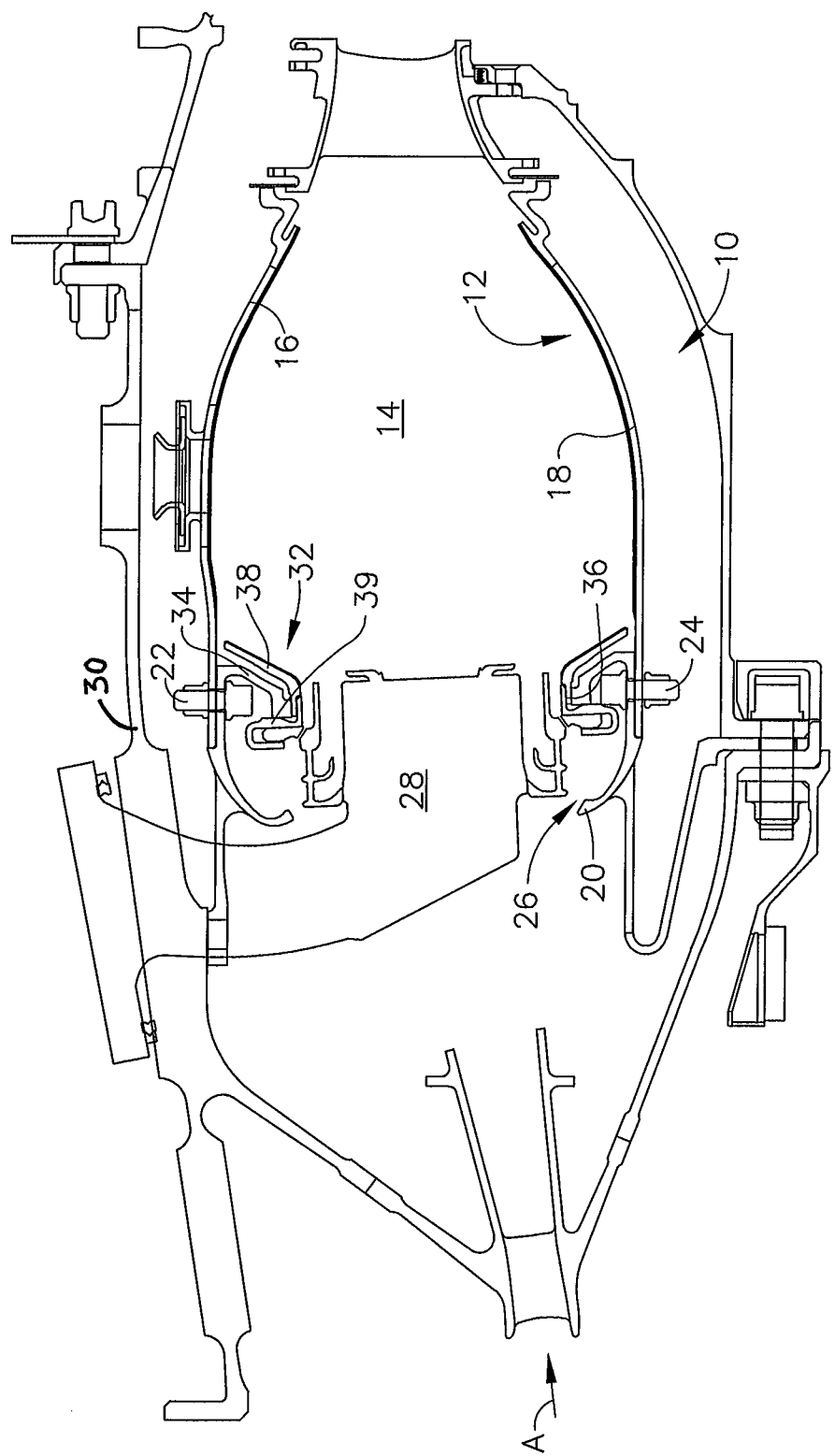
FIG. 1 is a schematic cross-sectional view of a gas turbine engine combustor including a combustor dome assembly constructed in accordance with an aspect of the present invention.

Referring to the drawings wherein identical reference numerals denote the same elements throughout the various views, FIG. 1 shows a combustor 10 of a type suitable for use in a gas turbine engine and including a hollow body 12 defining a combustion chamber 14 therein. The hollow body 12 is generally annular in form and is defined by an outer liner 16 and an inner liner 18. The upstream end of the hollow body 12 is substantially closed off by a cowl 20 attached to the outer liner 16 by a first row of fasteners 22 and to the inner liner 18 by a second row of fasteners 24. At least one opening 26 is formed in the cowl 20 for the introduction of fuel and compressed air. The compressed air is introduced into the combustor 10 from a compressor (not shown) in a direction generally indicated by arrow "A" of FIG. 1. The compressed air passes primarily through the opening 26 to support combustion and partially into the region surrounding the hollow body 12 where it is used to cool both the liners 16 and 18 and turbomachinery further downstream. An array of fuel injector stems 28 are mounted in a casing 30 which surrounds the combustor 10 and extend through the opening 26.

Located between and interconnecting the outer and inner liners 16, 18 near their upstream ends is a dome assembly 32 disposed coaxially about the centerline axis of the engine. The dome assembly 32 includes an annular dome plate 34 with opposed upstream and downstream faces 31 and 33. A plurality of apertures 36 are formed in the dome plate (one aperture 36 is provided for each fuel injector stem 28). The dome plate 34 is attached to the outer and inner liners 16, 18 via the first and second rows of fasteners 22, 24. A plurality of deflectors 38 are mounted to the dome plate 34 adjacent its downstream face 33. The purpose of the deflectors 38 is to prevent excessive dispersion of the fuel/air mixture and to shield the dome plate 34 from the hot combustion gases in the combustion chamber 14. A retainer 39 secures each deflector 38 to the dome plate 34. A mixer 40 (also referred to as a swirler) is received in each of the apertures 36 in the dome plate 34, and each mixer 40 receives the distal end of a fuel injector stem 28 therein.

It should be noted that, although FIG. 1 illustrates a combustor dome assembly in a single annular combustor, the present invention is equally applicable to other types of combustors, including multi-annular combustors. It should also be noted that the present invention is also applicable to other types of swirler assemblies as well.

Figure 2:
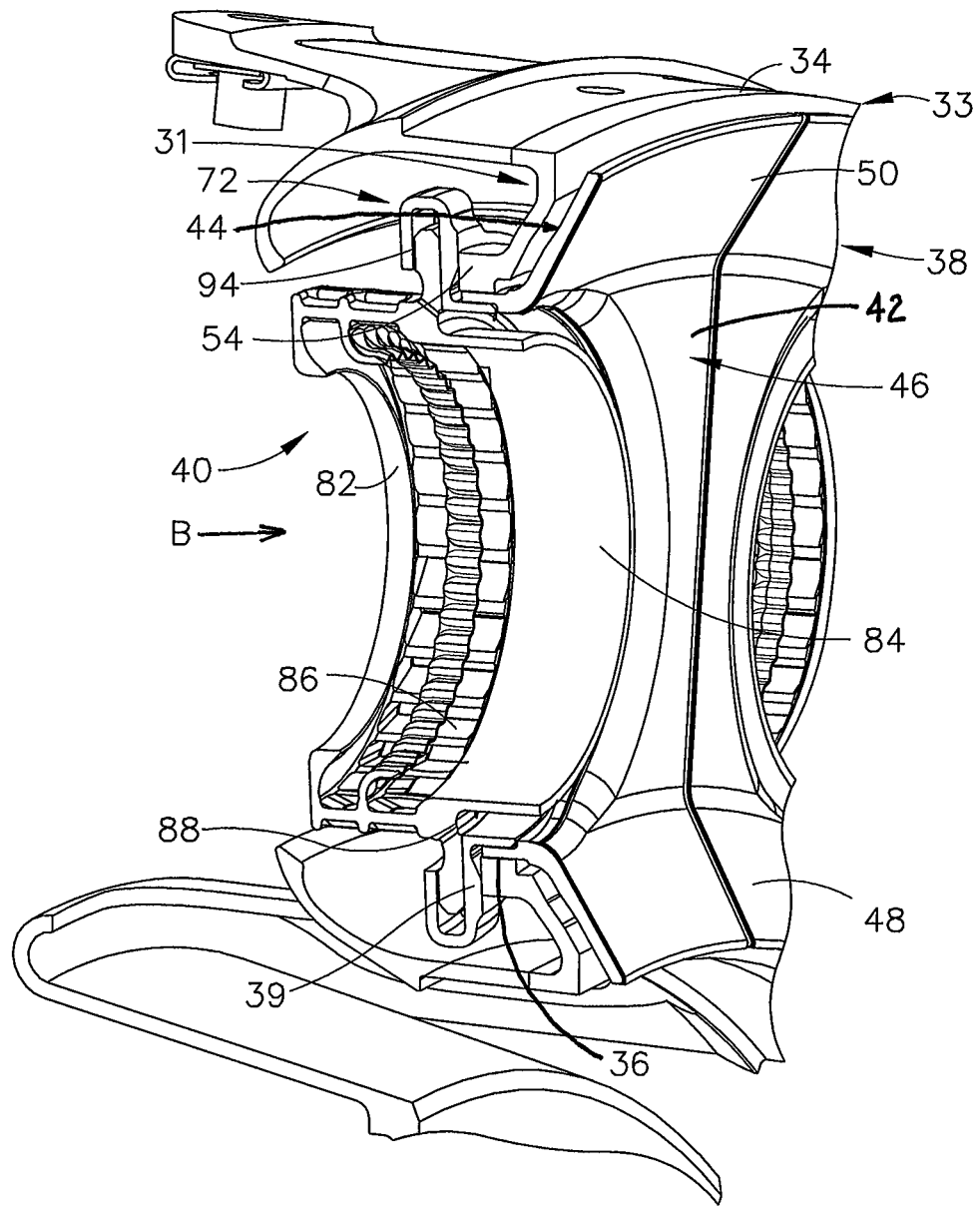
FIG. 2 is a sectioned perspective view of a portion of the dome assembly of FIG. 1.

As best seen in FIG. 2, each deflector 38 has a plate-like body 42 with forward and aft faces 44 and 46. Only one deflector 38 is described in detail, with the understanding that all the deflectors 38 are substantially identical. Radially inner and outer portions of the body 42 extend axially aft and radially outward to define extension panels 48 and 50, respectively. The aft face 46 of the body 42 and extension panels 48 and 50 can include a protective layer 52 (see FIG. 5). The protective layer 52 may be, for example, a known type of environmentally-resistant coating or thermal barrier coating ("TBC"). An annular tube section 54 extends axially forward from the body 42. The outer surface 56 of the tube section 54 is sized to fit closely within the aperture 36 in the dome plate 34. The inner surface 58 of the tube section 54 defines a mixer aperture. A portion of the inner surface 58 adjacent the distal end of the tube section 54 defines a rabbet or notch 62. The deflector 38 is fixedly attached to the dome plate 34. As used herein, the term "fixedly" means that the two components which are "fixedly attached" to each other do not experience relative movement to each other during normal operation of the combustor 10.

Figure 4:
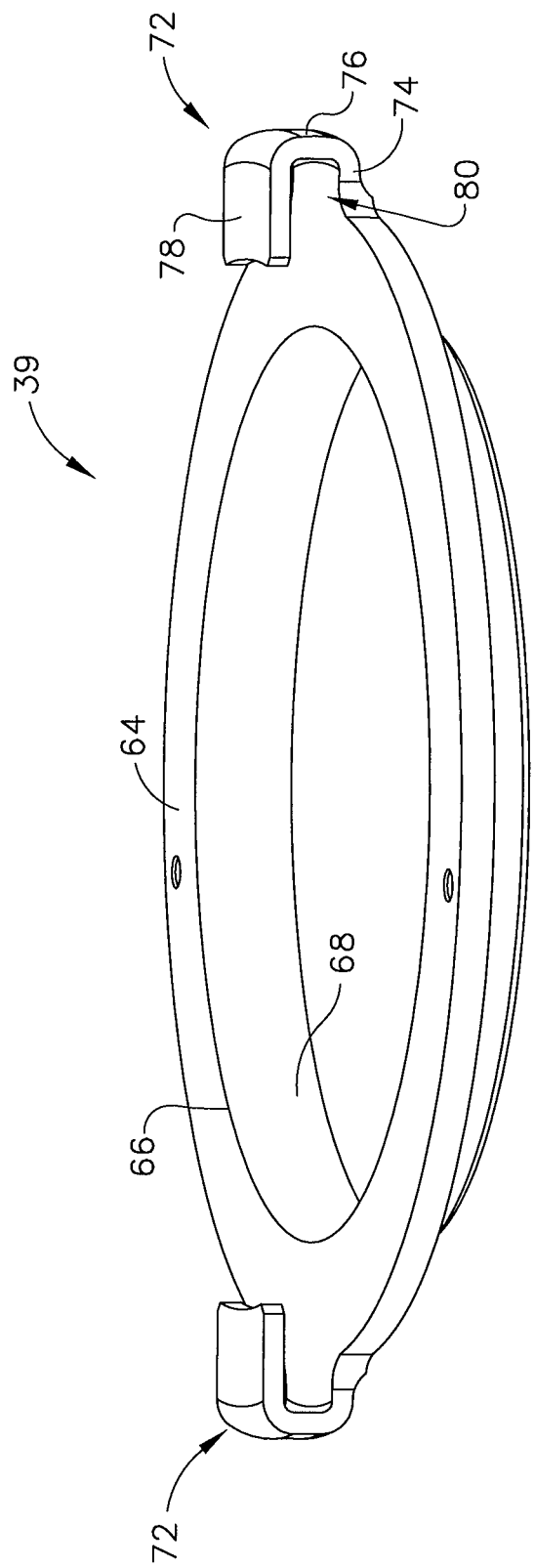
FIG. 4 is a perspective view of a retainer of the dome assembly of FIG. 1.
Figure 6:
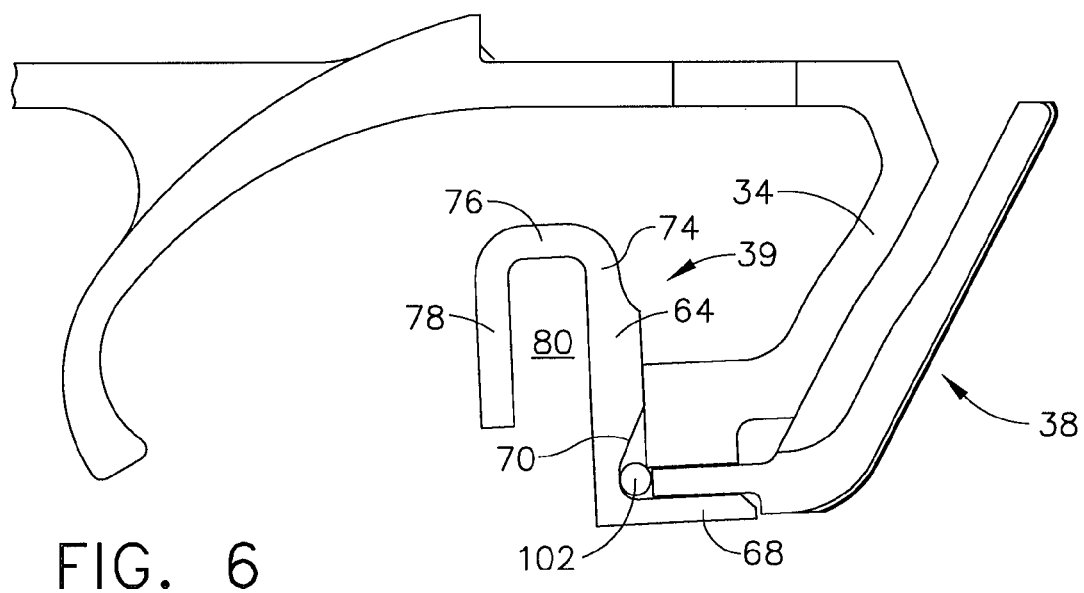
FIG. 6 is a schematic cross-sectional view of a portion of a dome during a second assembly step.

As best seen in FIGS. 4 and 6, each retainer 39 has an annular body 64 with a central opening 66. Only one retainer 39 is described in detail, with the understanding that all the retainers 39 are substantially identical. An annular flange 68 extends axially aft from the perimeter of the central opening 66. A concave annular groove 70 is formed in the intersection or "corner" between the body 64 and the flange 68. The retainer 39 includes at least one hook 72. The hook 72 is generally "U"-shaped in cross section, with a first radial leg 74 extending from the outer peripheral edge of the body 64, an axial leg 76 extending axially forward from the distal end of the first radial leg 74, and a second radial leg 78 extending radially inward from the axial leg 76. Collectively the legs 74, 76, and 78 define a gap or slot 80. The retainer 39 is fixedly attached to the dome plate 34, the deflector 38, or both, and the distal end of the flange 68 is received in the rabbet or notch 62.

Each mixer 40 (seen in FIGS. 2 and 3) is an annular component with generally cylindrical forward and aft sections 82 and 84. Only one mixer 40 is described in detail, with the understanding that all the mixers 40 are substantially identical. The forward section 82 includes a radial array of angularly directed swirl vanes 86. The swirl vanes 86 are angled with respect to the axial centerline "B" of the mixer 40 so as to impart a swirling motion to air flow entering the mixer 40. An annular mounting flange 88 extends radially outward at the junction of the two sections 82 and 84. One or more anti-rotation tabs 90 extend radially outward from the mounting flange 88. During engine operation, air forces on the swirl vanes 86 tend to rotate the mixer 40, which is intended to be a stationary component. Accordingly, the purpose of the anti-rotation tabs 90 is to prevent such rotation. They perform this function by bearing against corresponding tabs on an adjacent mixer 40, so that the complete "ring" of mixers 40 provides mutual anti-rotation to each other. The mounting flange 88 also incorporates at least one assembly anti-rotation feature. The purpose of the assembly anti-rotation feature is to restrict but not completely eliminate rotation of the mixer 40. In the illustrated example, the assembly anti-rotation feature comprises notches 92 formed in the mounting flange 88, which interact with welds as described in more detail below. Finally, one or more retention tabs 94 extend radially outward from the mounting flange 88.

Figure 5:
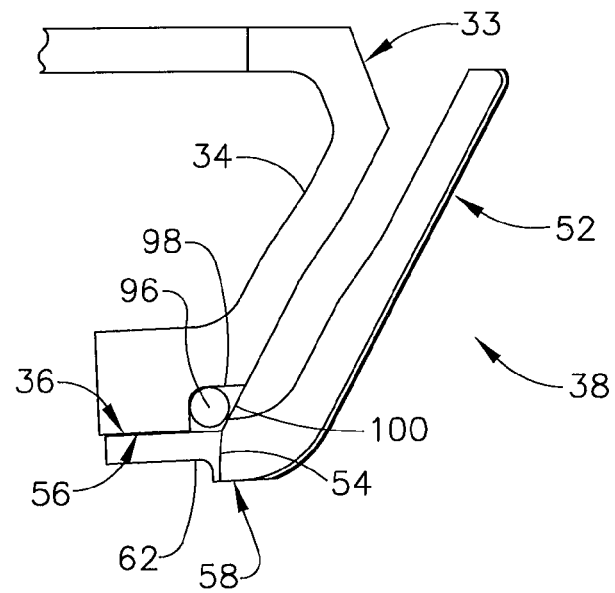
FIG. 5 is a schematic cross-sectional view of a portion of a dome during a first assembly step.

The dome assembly 32 proceeds as follows. As shown in FIG. 5, the first step is to place a first braze alloy ring 96 in an annular notch 98 formed the downstream face 33 of the dome plate 34. The first braze alloy ring 96 comprises a braze alloy of a known type having a melting point lower than the components to which it is applied. Braze material may be supplied in various forms such as powders, pastes, tapes, or rings. Some of these may include one or more fillers in addition to the braze alloy itself. The deflector 38 is then inserted into its dome plate aperture 36 such that the first braze alloy ring 96 is sandwiched between the aft surface of the dome plate 34 and an annular shoulder 100 of the deflector 38. Optionally, the outer surface of the deflector 38 may be sized for an interference fit with the aperture 36 of the dome plate 34. If an interference fit is present, insertion may be accomplished by a force fit, or other known techniques such as cooling the deflector 38 to contract it prior to insertion, or heating the dome plate 34 to expand the opening prior to insertion, or a combination thereof.

The foregoing steps are repeated for each one of the deflectors 38. Once all of the deflectors 38 are thus mounted onto the dome plate 34, the first braze alloy rings 96 are heated (for example by heating the entire assembly) to a temperature greater than the melting point of the braze alloy. Melted braze alloy flows throughout the interfaces between the deflectors 38 and the dome plate 34 by capillary action. The braze alloy is subsequently cooled to a temperature below its melting point. The braze alloy solidifies, thereby joining the dome plate 34 and the deflectors 38 together. The forward end of the joint can be visually inspected to ensure the braze has flowed out properly.

Next, a second braze alloy ring 102 is placed over the flange 68 of the retainer 39 and against the groove 70 as seen in FIG. 6. The retainer 39 is then inserted into the deflector aperture 36 such that the second braze alloy ring 102 is sandwiched between the forward surface of the dome plate 34 and the retainer 39. The flange 68 fits within the rabbet or notch 62 of the deflector 38. Optionally, the outer surface of the flange 68 may be sized for an interference fit with the rabbet or notch 62. If an interference fit is present, insertion may be, accomplished by a force fit, or other known techniques such as cooling the retainer 39 to contract it prior to insertion, or heating the deflector 38 to expand the opening prior to insertion, or a combination thereof.

The foregoing steps are repeated for each one of the retainers 39 and their corresponding deflectors 38. Once all of the retainers 39 are thus mounted onto the deflectors 38, the assembly is subjected to a second braze cycle (which may be carried out as described above for the first braze cycle). The aft end of the joint between each deflector 38 and retainer 39 can be visually inspected to ensure the braze has flowed out properly. The installed retainers 39 provide backup retention for the deflector-to-dome plate braze joint.

Figure 3:
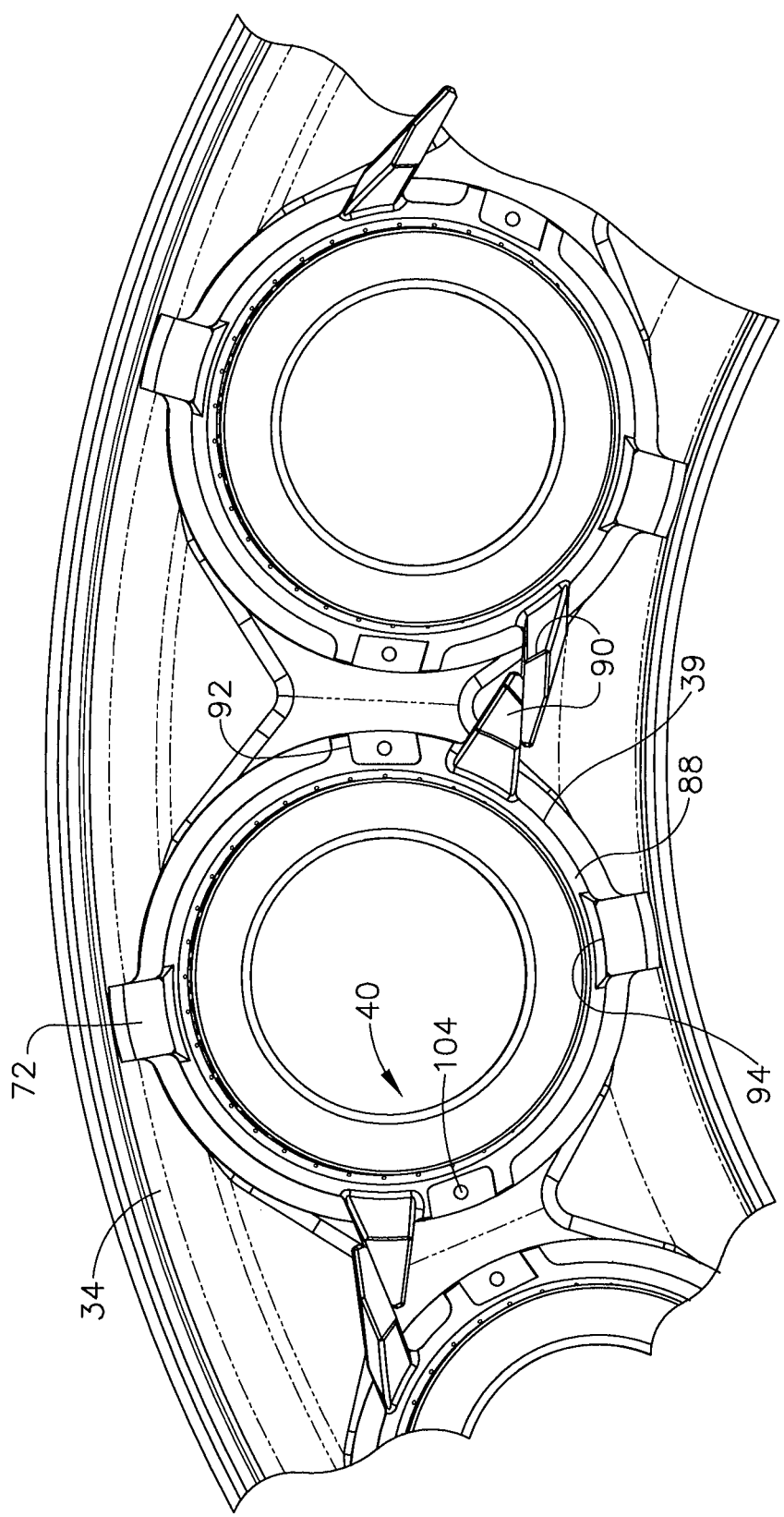
FIG. 3 is a front view of a portion of the dome assembly of FIG. 1.

After the brazing operations are complete, the mixers 40 are installed in the dome plate 34. Referring to FIGS. 2 and 3, each mixer 40 is inserted through the aperture 36 with the mounting flange 88 against the retainer 39 and the retention tabs 94 clear of the hooks 72. It is then rotated until the retention tabs 94 enter the slots 80 formed by the hooks 72. In this position, axial removal is impossible. An anti-rotation structure is then installed between the retainer 39 and the mixer 40. In the illustrated example, a small axially-protruding tack weld 104 is placed on the forward face of the retainer 39, positioned within the notches 92 in the mounting flange 88 of the mixer 40. The anti-rotation structure intentionally permits some rotation of the mixer 40, but prevents the mixer 40 from rotating sufficiently to disengage the hook 72. Alternatives such as peening or upsetting of the components, fasteners, clips, etc. could be used in place of the welds 104 to limit rotation.

Once assembled as described above, the mixers 40 are retained to the dome plate 34 and will not become dislodged by further handling and assembly steps, such as installation of the fuel injector stems 28.

The combustor dome assembly described herein has several advantages over a prior art design. It provides a redundant braze joint while also providing the mixer retention function. In contrast, prior art designs require separate bolted on components to retain the mixers. This drives up the complexity and time required to assemble the combustor. There is a lower thermal mass because of the lack of bolted joints, which reduces thermal stresses in the dome assembly. Added stability is also achieved by moving the mixer retention off the cowl or bolted joint and onto the dome plate 34, as the dome plate 34 is less susceptible to relative deflection during aircraft maneuvering.

The foregoing has described a combustor dome assembly for a gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A combustor dome assembly comprising:
    an annular dome plate with opposed upstream and downstream faces and having an aperture formed therein;
    a deflector having a body and a tube section extending axially therefrom, the deflector disposed adjacent the downstream face, and fixedly attached to the dome plate with the tube section received in the aperture;
    a retainer having an annular body with a central opening therein, an annular flange extending axially from a perimeter of the central opening, and at least one hook extending away from the body so as to define a slot, the retainer being disposed adjacent the upstream face of the dome plate, and fixedly attached to the dome plate with the flange received in the aperture; and
    an annular mixer including a radial array of swirl vanes and an annular mounting flange, with a retention tab extending radially outward from the mounting flange, the mixer disposed adjacent the upstream face with the mounting flange against the retainer, and a portion thereof received in the aperture, wherein the retention tab is engaged in the slot so as to prevent axial withdrawal of the mixer from the retainer.

2. The dome assembly of claim 1 wherein the hook of the retainer is generally U-shaped in cross section, with a first radial leg extending from an outer peripheral edge of the body, an axial leg extending axially forward from a distal end of the first radial leg, and a second radial leg extending radially inward from the axial leg, wherein the legs collectively define the slot.

3. The dome assembly of claim 1 wherein an annular notch is formed in the downstream face of the dome plate surrounding the aperture.

4. The dome assembly of claim 1 wherein an inner surface of the tube section of the deflector defines a rabbet which is configured to receive the flange of the retainer therein.

5. The dome assembly of claim 4 wherein a distal end of the flange of the retainer is received in the rabbet.

6. The dome assembly of claim 1 wherein a concave annular groove is formed at an interior corner defined between the body and the flange of the retainer.

7. The dome assembly of claim 1 wherein the mixer includes at least one anti-rotation tab extending radially outward from the mounting flange.

8. The dome assembly of claim 1 further including means for preventing rotation of the mixer relative to the retainer to a degree sufficient to disengage the hook.

9. The dome assembly of claim 1 wherein the mounting flange of the mixer includes a notch formed therein.

10. The dome assembly of claim 9 wherein a weld protrusion is formed on the body of the retainer within the notch.

11. The dome assembly of claim 1 wherein radially inner and outer portions of the body of the deflector extend axially aft and radially outward to define extension panels.

12. The dome assembly of claim 1 including a plurality of deflectors, retainers, and mixers.

13. A method of assembling a combustor dome comprising:
    providing an annular dome plate with opposed upstream and downstream faces and having an aperture formed therein;
    providing a deflector which has a body and a tube section extending axially therefrom;
    fixedly attaching the deflector to the dome plate adjacent the downstream face, with the tube section received in the aperture;
    providing a retainer having an annular body with a central opening therein, an annular flange extending axially from a perimeter of the central opening, and at least one hook extending away from the body so as to define a slot;
    fixedly attaching the retainer to the dome plate adjacent the upstream face, with the flange received in the aperture;
    providing an annular mixer including a radial array of swirl vanes and an annular mounting flange that is disposed in the aperture, with a retention tab extending radially outward from the mounting flange;
    mounting the mixer adjacent the upstream face of the dome plate with the mounting flange against the retainer, with the retention tab free of the hook; and
    rotating the mixer such that the retention tab engages the slot of the hook so as to prevent axial withdrawal of the mixer from the retainer.

14. The method of claim 13 further including installing an anti-rotation feature between the mixer and the retainer permits some rotation of the mixer, but prevents the mixer from rotating sufficiently to disengage the hook.

15. The method of claim 14 wherein the anti-rotation feature is a tack weld applied to the body of the retainer disposed within a notch in the mounting flange of the mixer.

16. The method of claim 13 wherein the deflector is fixedly attached to the dome plate by brazing.

17. The method of claim 13 wherein the mixer is fixedly attached to the dome plate by brazing.

18. The method of claim 13 wherein an inner surface of the tube section of the deflector defines a rabbet, and the flange of the retainer is inserted therein.

* * * * *